Aug. 15, 1972   D. A. NEWMAN   3,684,550

TRANSFER ELEMENT AND PROCESS

Filed April 9, 1970

INVENTOR.
Douglas A Newman
BY
Johnson and Kline
ATTORNEYS

United States Patent Office 3,684,550
Patented Aug. 15, 1972

3,684,550
TRANSFER ELEMENT AND PROCESS
Douglas A. Newman, Glen Cove, N.Y., assignor to Columbia Ribbon and Carbon Manufacturing Co., Inc., Glen Cove, N.Y.
Filed Apr. 9, 1970, Ser. No. 26,818
Int. Cl. B41m 5/10
U.S. Cl. 117—36.4                                    8 Claims

ABSTRACT OF THE DISCLOSURE

Pressure-sensitive transfer elements having an oleophilic polyolefin film foundation and an oleous wax transfer layer which normally has a high affinity for said film foundation, characterized by the interposition of a thin, non-oleophilic layer between said film foundation and said transfer layer.

---

Figure 1:
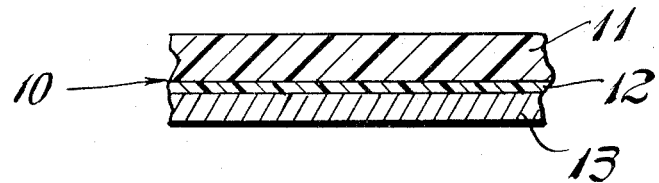

The present invention relates to the production of novel transfer elements including sheets such as carbon papers and ribbons such as typewriter ribbons and printing ribbons, such elements carrying a layer of imaging composition which is frangible or mass-transferable in image form under the effects of imaging pressure such as writing or typing pressure. More specifically this invention relates to transfer elements having a polyolefin film foundation, such as polyethylene or polypropylene, and a hot-melt-applied wax imaging layer.

A variety of transfer elements have been proposed which have a plastic film foundation supporting an imaging layer which is mass-transferable in image form under the effects of imaging pressure. Oriented polyethylene terephthalate polyester films, such as one available under the registered trademark Mylar, have enjoyed the most widespread use as foundations for pressure-sensitive transfer elements. Other films such as cellulosic and vinyl films are also in common use for this purpose.

Films such as Mylar, cellulosic, vinyl, and the like, are quite inert with respect to wax transfer layers and thus permit them to transfer cleanly therefrom under the effects of imaging pressure. However such inertness is so great that the wax transfer layer loses adhesion with the film foundation and flakes off of the foundation prior to imaging use, such as during handling or transport through the typewriter, or picks off of the foundation and adheres to the underside of the contacting surface of the film foundation in the next convolution of the ribbon wound on a spool, particularly when the ribbon is wound tightly.

These problems with prior known ribbons have been overcome by applying an intermediate bonding layer or undercoating between the film foundation and the wax transfer layer, the wax imaging layer having a much greater affinity for the bonding layer than for the film foundation. The bonding layer is generally a layer of vinyl resin, containing filler or pigment to increase the affinity of the wax layer, and is not pressure-transferable.

While these solutions overcome the problem of bonding the transfer layer to the film foundation, they result in a degradation of the transfer properties of the wax imaging layer. If the adhesion between the bonding layer and the imaging layer is strong enough to prevent flaking and inadvertent transfer of the imaging layer, then such adhesion interferes with the complete transfer of the imaging layer under the effects of imaging pressure.

Polyolefin film foundation transfer elements are also in common use today. Polyolefin films are oleophilic and thus have a normal affinity for wax transfer layers so that they do not require any intermediate bonding layer to improve the adhesion between the film foundation and the imaging layer. Transfer elements of this type do not have the disadvantages of uncoated Mylar base elements in that the wax imaging layer will not flake off of the foundation or transfer therefrom to the back surface of the next convolution of ribbon on a tightly-wound spool. However polyolefin base wax ribbons have the disadvantage that they do not transfer the wax imaging layer as sharply and completely as ribbons based upon uncoated Mylar. Thus they perform similarly to Mylar ribbons which have an intermediate bonding layer.

The present invention is directed towards the problem of providing a pressure-sensitive transfer element which has a plastic film foundation supporting a frangible wax imaging layer which has sufficient adhesion for said foundation that it will not crack and flake off of the foundation prior to imaging use and will not transfer to the back surface of the next convolution of the ribbon in a tightly-wound spool, and yet is sharply and completely transferable from the foundation film under the effects of imaging pressure. This invention is based upon the discovery that the strong affinity between oleophilic films such as polyolefin films and wax transfer layers is due to the oleophilic nature of both of these elements and particularly the oleophilic nature of the film. It appears that the waxes and the oily materials, present in a wax transfer layer to soften or plasticize the wax, may be attracted to and absorbed to some extent by the surface of the film foundation. Whether due to mere oleophilic affinity or due to a change within the wax imaging layer, the latter is not sharply or completely transferable from the polyolefin foundation. According to the present invention, it has been discovered that the solvent application of a very thin, oleophobic undercoating over the oleophilic film foundation provides a semi-barrier between the foundation and the wax imaging layer applied thereover whereby the oleophilic affinity between the film foundation and the wax layer is masked and the oleous ingredients of the imaging layer are prevented from bonding to or penetrating the surface of the oleophilic film foundation.

Figure 2:
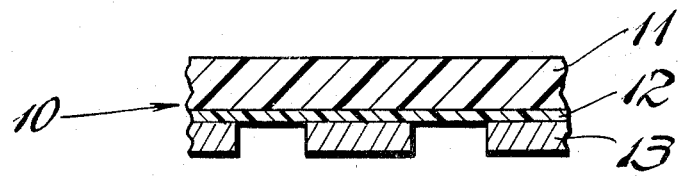

Referring to the drawings:

FIG. 1 is a diagrammatic cross-section, to an enlarged scale, of a transfer element produced according to the present invention, and FIG. 2 illustrates the transfer element of FIG. 1 after use whereby the imaging layer is removed in the impressed areas.

The drawings illustrate a pressure-sensitive transfer element 10 having an oleophilic film foundation 11, a thin oleophobic undercoating 12 and a frangible wax imaging layer 13. Under the effects of imaging pressure, the imaging layer 13 transfers substantially completely to a copy sheet in image form to leave evacuated areas 14 which are substantially free of the imaging layer.

According to the preferred embodiments of the present invention, the present transfer elements comprise a foundation of oriented polyethylene or polypropylene polyolefin film having a thickness of from about 0.35 to 1.5 mil, a thin oleophobic wash coating of vinyl resin of immeasurable thickness but having a weight of between about 0.05 and 0.0005 gram per square foot of film, and a hot-melt-applied wax imaging layer having a thickness of from about 1½ to 10 points, a point being equal to 0.0001 inch.

The most preferred vinyl resin is alcohol-soluble polyvinyl butyrate. However, other vinyl resins such as polyvinylidene chloride, polyvinyl butyral, polyvinyl acetate, vinyl chloride-vinyl acetate copolymer, styrene-methyl methacrylate copolymer, and the like, are also very suitable, as well as non-vinyl resins such as alcohol-soluble nylon. The intermediate layer is applied by dissolving the resin in a volatile solvent, which is a non-solvent for the polyolefin film, to form a solution containing from about 3% to about 20% by weight of the resin. The solution is then applied as a continuous wet layer over the surface of the polyolefin film in such amounts that the weight of the resin remaining on the film after evaporation of the volatile solvent falls within the range recited above.

Finally the wax imaging layer is applied over the oleophobic layer as a hot-melt layer having the desired thickness. The imaging layer comprises one or more waxes as the binder material for the pigment and for the filler, if present. The composition may also contain one or more oils as softeners for the wax, if necessary, depending upon the nature of the wax and the amount used. The pigment may be carbon black, undissolved dyestuff particles, magnetic iron oxide, or the like.

The following example is given as an illustration of one embodiment of the invention.

A film of 0.5 mil oriented polyethylene is coated on one surface on a conventional solvent-coating machine with a thin wash coating of the following composition:

| Ingredients: | Parts by wt. |
|---|---|
| Vinylite XYSG (polyvinyl butyrate) | 2.5 |
| Ethanol | 95.0 |
| Water | 2.5 |

The coated film is heated in a drying tunnel to evaporate the solvents and leave an oleophobic vinyl coating having a weight of 0.005 gram per square foot on the polyethylene.

Next the vinyl surface of the polyethylene is coated with a conventional hot-melt wax composition as follows in a thickness of 3 points:

| Ingredients: | Parts by wt. |
|---|---|
| Carnauba wax | 41.0 |
| Beeswax | 3.5 |
| Lanolin | 5.0 |
| Heavy mineral oil | 21.0 |
| Methyl violet base | 1.0 |
| Dye toned carbon black | 15.0 |
| Lecithin | 1.0 |

The wax composition is cooled to cause it to solidify, and the coated film is cut into sheets or ribbons. If desired, the opposite surface of the polyethylene may be initially coated on the back surface with a conventional anti-static wash coating, or may be printed or otherwise treated in conventional manner.

Sheets and ribbons for typing and printing use produced according to this invention have excellent properties with respect to sharpness and clarity of copy, resistance to picking or flaking of the imaging layer and completeness of transfer during a single use. Referring to the drawings, the undercoating 12 separates the oleophilic film 11 from the oleophilic imaging layer 13 so that the imaging layer is able to transfer substantially completely from the oleophobic undercoating, for which it has no affinity, under the effects of imaging pressure as illustrated by areas 14.

The present disclosure is given as a specific illustration of the present invention. Variations and additions within the scope of the present claims will be obvious to those skilled in the present art.

I claim:
1. Process of producing pressure-sensitive transfer elements comprising the steps of:
   (a) coating a flexible, thin, oleophilic plastic film selected from the group consisting of polyethylene and polypropylene with a dilute solution comprising from about 3% to 20% by weight of an oleophobic synthetic thermoplastic resin in a volatile solvent which is a non-solvent for said film,
   (b) evaporating the solvent to form a thin oleophobic undercoating having a weight of from about 0.0005 to 0.05 gram per square foot of said oleophilic film, and
   (c) applying a thin pressure-transferable oleophilic wax imaging layer as a hot-melt over said oleophobic coating.

2. Process according to claim 1 in which the film foundation is polyethylene.

3. Process according to claim 1 in which the oleophobic resin is a vinyl resin.

4. Process according to claim 3 in which the vinyl resin is an alcohol-soluble polyvinyl butyrate and the volatile solvent is an alcohol.

5. A pressure-sensitive transfer element comprising a flexible, thin, oleophilic plastic film selected from the group consisting of polyethylene and polypropylene having on one surface thereof from about 0.0005 to 0.05 gram per square foot of a thin oleophobic resin undercoating and having on said undercoating a hot-melt-applied pressure-transferable oleophilic wax imaging layer.

6. A transfer element according to claim 5 in which the film foundation is polyethylene.

7. A transfer element according to claim 5 in which the oleophilic resin is a vinyl resin.

8. A transfer element according to claim 7 in which the vinyl resin is an alcohol-soluble polyvinyl butyrate.

References Cited

UNITED STATES PATENTS

| 3,337,361 | 8/1967 | La Count | 117—36.4 |
| 3,359,900 | 12/1967 | Newman | 117—36.4 |
| 3,442,680 | 5/1969 | Newman | 117—36.4 |
| 2,508,725 | 5/1950 | Newman | 117—36.4 |

MURRAY KATZ, Primary Examiner

U.S. Cl. X.R.

117—76 F, 92, 138.8 E